United States Patent [19]

Zarr

[11] Patent Number: 4,755,900
[45] Date of Patent: Jul. 5, 1988

[54] TAPE CARTRIDGE DRIVE WITH TAPE BIASING ARM TO ALLOW HEAD MOVEMENT NORMAL TO TAPE PATH

[75] Inventor: Myron Zarr, St. Paul, Minn.

[73] Assignee: Minnesota Mining and Manufacturing Company, St. Paul, Minn.

[21] Appl. No.: 882,679

[22] Filed: Jul. 7, 1986

[51] Int. Cl.$^4$ ............................................. G11B 15/60
[52] U.S. Cl. ................................. 360/130.1; 360/105; 360/96.5
[58] Field of Search ............... 360/105, 109, 130.1, 360/130.32, 96.6, 106, 93, 130.30, 130.31, 96.5

[56] References Cited

U.S. PATENT DOCUMENTS

| | | | |
|---|---|---|---|
| 3,042,753 | 7/1962 | Iwamura | 360/130.1 |
| 3,692,255 | 9/1972 | Von Behren | 242/192 |
| 3,710,037 | 2/1971 | Adams et al. | 360/130.1 |
| 3,942,189 | 7/1974 | Jenkins | 360/130.1 |
| 4,040,114 | 4/1976 | Jenkins | 360/130.1 |
| 4,313,143 | 1/1982 | Zarr | 360/106 |
| 4,556,923 | 12/1985 | Olmsted | 360/93 |
| 4,573,091 | 2/1986 | Barton et al. | 360/93 |
| 4,639,814 | 1/1987 | Ueno et al. | 360/130.1 |

*Primary Examiner*—Robert S. Tupper
*Assistant Examiner*—Andrew L. Sniezek
*Attorney, Agent, or Firm*—Donald M. Sell; James A. Smith; David W. Anderson

[57] ABSTRACT

A data cartridge which is edge loaded must be loaded before the access door is opened, permitting the head to enter the cartridge but entry and opening of the door can be accomplished when the head is moved vertically from a first lowered position to an upper operative position against the tape and to permit movement of the head to the upper operative position, the tape must be temporarily moved from its path in the cartridge to permit vertical movement of the magnetic head without contacting the tape. The present invention permits tape movement and head positioning upon operation of a cam shaft with a front knob.

4 Claims, 3 Drawing Sheets

TAPE CARTRIDGE DRIVE WITH TAPE BIASING ARM TO ALLOW HEAD MOVEMENT NORMAL TO TAPE PATH

BACKGROUND OF THE INVENTION

1. Field of the Invention

This invention relates to a drive mechanism for a data recording cartridge, and in one aspect, to a system permitting the opening of a cartridge door, movement of the tape from its normal path, raising of the head through the normal tape path in the cartridge and returning the tape to a position against the head.

2. Description of the Prior Art

This invention relates to the loading of tape cartridges edgewise, which tape cartridges are provided with a door affording access to the tape which is positioned along a path in one side of the cartridge. Prior devices for loading a cartridge edgewise or endwise as opposed to sideways, have been known, for example, U.S. Pat. No. 4,573,091 (Barton et al), wherein the access door is opened when the cartridge is inserted edgewise into a slot. The magnetic head is then pivoted about an axis parallel to the axis of the tape reels from a retracted position to a position engaging the magnetic tape. This pivoting movement also serves to bring the drive system into engagement with the cartridge.

In most other data cartridge drive systems the cartridge is loaded sideways such that the cartridge is placed into the machine and the door is opened during the insertion of the cartridge and then the cartridge is moved to place the tape up against a head which is fixed except for its ability to move vertically with respect to the plane of the tape to move the magnetic head to different tracks along the tape. Such a device is illustrated in U.S. Pat. No. 4,313,143 (Zarr), issued to the present applicant and assigned to the assignee of this application.

The present invention however allows the use of the data cartridge as described and claimed in U.S. Pat. No. 3,692,255 (Von Behren), to be interchangeable wth 5¼ disk drives without reduction in the size of the cartridge.

The present invention further permits the same discrete incremental movement of the magnetic head for recording multiple tracks in the data cartridge as that achieved with the earlier cartridge drive mechanisms such as illustrated in U.S. Pat. No. 4,313,143 (Zarr).

The present invention further provides the assurance that the magnetic tape within a data cartridge is free from contact with the head as the head is moved vertically into and from an operative position.

The present invention provides a drive mechanism for a data cartridge which permits the drive mechanism to be mechanically interchangeable with a 5¼ inch Winchester disk drive or a floppy disk drive as a backup memory device in personal and small business computer systems. The improved drive mechanism of the present invention permits the cartridge to be edge loaded and the magnetic head is moved vertically on a fixed post into operative position. The proper location of the head is afforded with less stringent production standards with the present invention than necesssary in machines where the head swings from a retracted position into the operative position.

SUMMARY OF THE INVENTION

The objects and advantages of the present invention over those of the prior art will be further described.

The present invention comprises a drive mechanism for an elongate rectangular tape cartridge and comprises a frame having a front opening for receiving the cartridge edgewise. A control knob positions the drive wheel in a retracted position and the magnetic head in a lowered retracted position from the path of the cartridge during insertion. When the cartridge is seated in the frame the control knob on the front of the device actuates a cam shaft to lock the cartridge in position on the frame, open an access door on the cartridge to expose the tape path adjacent one side of the cartridge, retract the tape from its normal position, slide the magnetic head from a retracted position into position along the tape path, place the drive wheel in contact with the tape drive capstan and release the magnetic tape to move the same against the magnetic head.

A tape biasing arm is pivotally mounted for movement about an axis disposed generally parallel to the path of the tape and positioned inwardly of the path of the tape to be pivoted about said axis to engage the tape and move the same inwardly of the cartridge away from its normal path. This movement of the tape biasing arm is accomplished during the movement of the head from a lowered position below the plane of the bottom wall of the cartridge into play position adjacent the tape. The tape biasing arm is then retracted from engagement with the tape to allow the same to engage the face of the magnetic head.

The movement of the tape biasing arm is afforded by a lever engaged with a cam on the cam shaft. The lever permits the head slide mount, slidably mounted on a stationary shaft, to raise the head under the force of a spring. A projection on the head slide mount engages the tape bias arm to pivot the same about an axis extending in the direction of the plane of the tape to a position engaging the tape first at its bottom edge and then against the plane of the tape to move the same inwardly of the cartridge out of its normal path. When the head is raised to its operating position, the tape bias arm is retracted from engagement with the tape, allowing the tape to return towards its normal position into engagement with the magnetic head.

Additional cams on the cam shaft serve to initially open the access door on the cartridge prior to movement of the magnetic head, to lock the cartridge in a stationary position on the frame and to move the drive wheel into contact with the drive roller for the belt which drives the tape in the data cartridge as described in U.S. Pat. No. 3,692,255.

BRIEF DESCRIPTION OF THE DRAWING

The present invention will be further described with references to the accompanying drawing wherein.

DESCRIPTION OF THE PREFERRED EMBODIMENT

Figure 1:
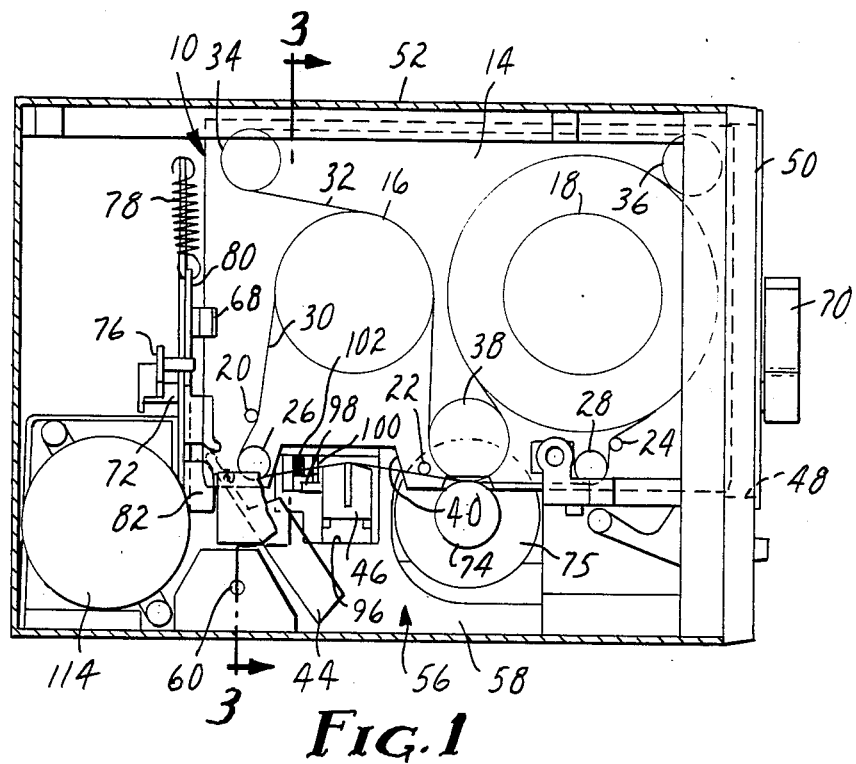
FIG. 1 is a plan view of the drive format for a belt driven rectangular tape cartridge.
Figure 2:
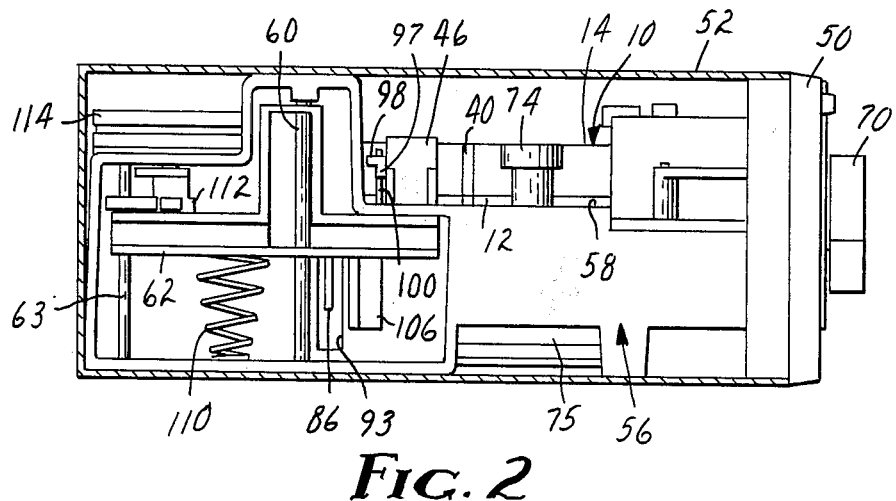
FIG. 2 is a side elevational view of the drive mechanism.

The present invention relates to a drive mechanism for a belt driven magnetic tape cartridge which is known in the art as a data cartridge corresponding to that illustrated in U.S. Pat. No. 3,692,255 (Von Behren) which cartridge is illustrated in FIG. 1 and designated by the reference numeral 10. The data cartridge 10 includes a thin base plate 12, usually of aluminum, and a clear or translucent polymeric cover 14, which, when assembled, defines a thin, generally rectangular enclosure including a top, end walls and side walls. Enclosed within the data cartridge 10 are a pair of tape spools 16 and 18, three tape wrap pins 20, 22, and 24, a pair of tape guides 26 and 28, a length of magnetic recording tape 30, a driving belt 32, a pair of belt guide rollers 34 and 36, and a belt driving roller 38.

The tape spools 16 and 18 are supported by the cartridge base plate 12 for free rotation about spaced parallel axis. The magnetic recording tape 30 is convolutely wound on the tape spool 16 and 18 in opposite directions about their axis. The tape 30 guide path between the tape spool 16 and 18 is defined by the three tape wrap pins 20, 22, and 24, and the two tape guides 26 and 28.

The cartridge 10 is formed with a cutaway portion 40 along the tape path on one side which provides access to the magnetic tape 30. The cutaway portion 40 is normally closed by a spring-loaded access door 44. Opening the access door 44 affords access to the magnetic tape along its path between the tape guides 26 and 28 by a magnetic transducer or magnetic head 46.

The tape cartridge 10 is loaded into the tape drive mechanism of the present invention edgewise through an opening 48 at the front panel 50 of a frame 52. The frame includes an interior cast aluminum frame 56 and shaped to define a cartridge supporting platform 58 and a support structure for a fixed shaft 60 upon which a molded head slide mount 62 is supported. The slide mount 62 is restricted from rotation about the shaft 60 by a bifurcated end contacting a second vertical shaft 63.

The cartridge 10 is inserted edgewise through the opening 48 toward the rear of the drive mechanism. This drive mechanism is designed to fit in an opening in a personal or small business computer system which is $3\frac{1}{4} \times 5\frac{1}{4} \times 8$ inches in dimension to be an interchangeable backup memory device in such systems for existing $5\frac{1}{4}$ inch Winchester disk drives or floppy disk drives. When the cartridge is seated in the opening and on the frame 58, it engages a leaf spring 68 at the rear of the mechanism and biases the spring to a position where the spring locks the front edge of the cartridge against a shoulder in the front panel 50 adjacent the opening 48. With the cartridge in the position as generally illustrated in FIG. 1 the operator may now rotate the control knob 70 at the front of the drive mechanism. The control knob 70 rotates a cam shaft 72 which extends lengthwise of the drive mechanism.

The cam shaft 72 supports a plurality of cams positioned axially along its length. The cams on shaft 72 engage a plurality of levers operative to open the cartridge access door 44, lock the cartridge into position on the platform 58, rock a drive wheel 74 and associated motor 75 into position to engage the drive wheel 74 with the belt drive roller 38 and displace the tape 30 to allow vertical movment of the magnetic head 46 into the recess portion 40 to engage the tape, and then release the tape.

One of the functions of shaft 72 and an associated cam is to release a lever 76, allowing a spring 78 to draw a transversely extending bar 80 in a direction to cause a cam 82 to engage the access door 44 and urge the same to open position as illustrated in FIG. 1.

Figure 3:
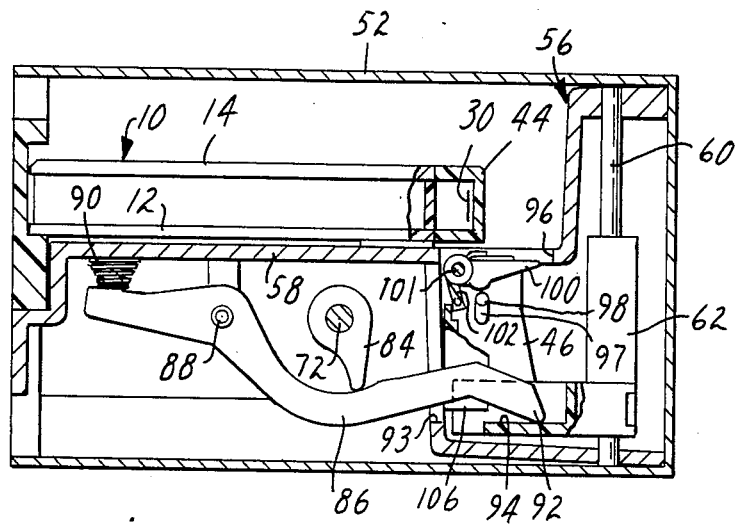
FIGS. 3, 4, 5, and 6 are transverse vertical sectional views taken along line 3—3 of FIG. 1, illustrating the operation of the tape retracting and head positioning device.
Figure 4:
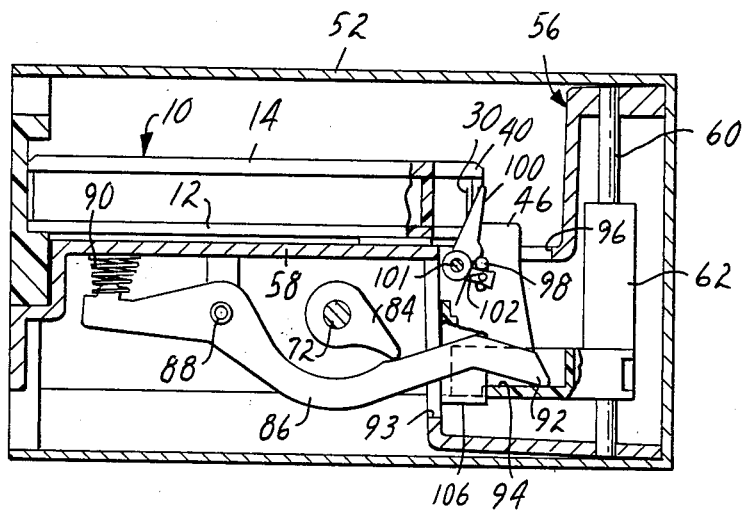
Figure 5:
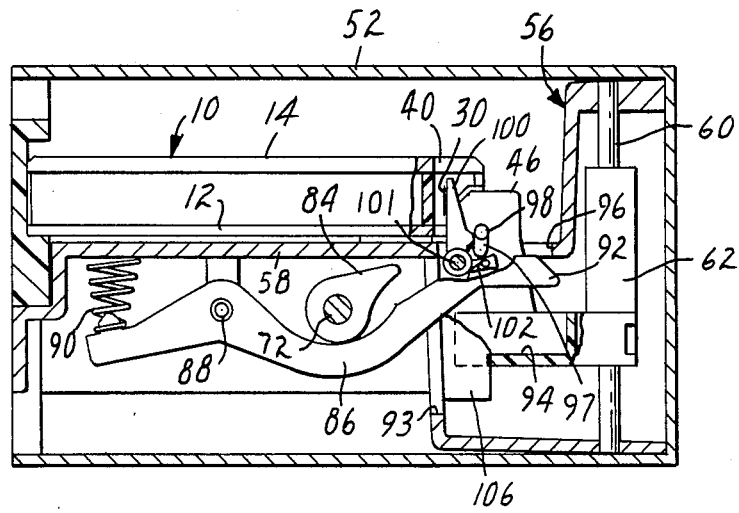
Figure 6:
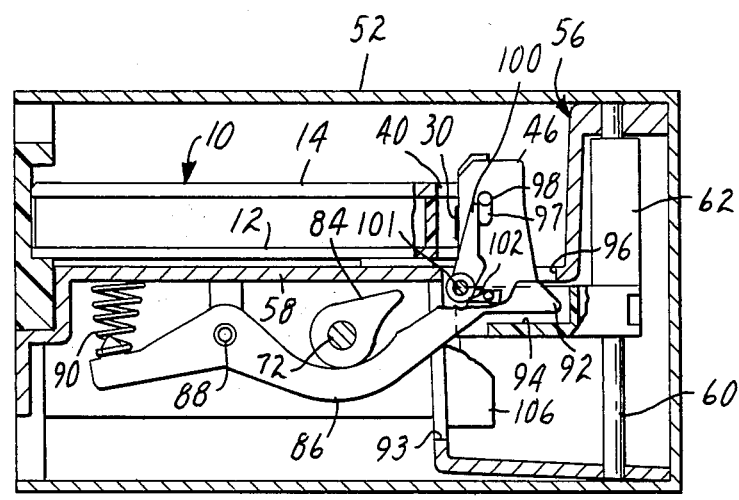

During continued rotation of the cam shaft 72 by the rotation of the control knob 70 also begins to rotate a cam 84 illustrated in FIG. 3, to move the same toward the position of FIG. 4 where cam 84 begins to release a lever 86 extending transversely of the frame. Lever 86 is pivoted about a shaft 88 and is maintained against the cam 84 by a compression spring 90 which is positioned at one end and the other end 92 extends through an opening 93 in the frame 56 to engage a recess 94 in the slide mount 62. Cam shaft 72 is rotated and cam 84 is rotated in a counterclockwise direction, as shown in FIGS. 3 through 6. The slide mount 62 is permitted to slide upwardly on the shaft 60 under the bias of a spring 110 as the lever 86 pivots, raising the head 46 through another opening 96 in the frame 56, bringing it into the recess portion 40 of the cartridge.

As the slide mount 62 and the head 46 move upwardly a protrusion 97 having an outwardly projecting pin 98 on the head 46 engages a cam surface on a tape bias arm 100, causing the tape bias arm to pivot about an axis 101 against the bias of a torsion spring 102. As the cam 84 continues to turn the tape bias arm 100 engages the tape 30 urging it inward of the cartridge out of the path of the upwardly moving head 46. The biasing of the tape is accomplished prior to the head reaching the tape 30. The tape bias arm 100 is generally L-shaped and the pivot axis is at the vertex such that the long leg engages the lower edge of the tape and then the entire width of the tape. The torsion spring 102 is wrapped about the pivot axis of the arm and has one end engaging the shorter leg of the L-shaped arm 100 which shorter leg is spaced along the pivot axis from the longer leg and extends at substantially right angles to the longer leg. The torsion spring 102 is anchored at its other end in a vertically disposed right angle bracket 106 which supports the pin 101 defining the pivot axis for the tape bias arm 100. Continued rotation of the shaft 72 then releases end 92 of lever 86 from the slide mount 62 and spring 110 brings the head 46 into position opposite the tape. The protrusion 97 also moves away from the cam surface on the long leg of the tape bias arm 100, and the torsion spring 102 urges the tape bias arm away from the tape against the protrusion, bringing the tape 30 against the face of the magnetic head. At this time the slide mount 62 has been urged upwardly by the bias of spring 110 which also brings the slide mount 62 against the head of a screw follower 112 driven by a lead screw extending from a stepping motor 114 which positions the gap of the head for reading or recording one of a plurality of tracks disposed on the tape. This control mechanism for the head operates substantially similar to that disclosed in U.S. Pat. No. 4,313,143 (Zarr) referred to above. Movement of the head 46, when controlled by motor 114, is free of the lever 86.

The cam shaft 72 also includes cams engageable with a microswitch, indicating that the cartridge is in place and the head and drive mechanism are properly positioned for operation, and further, locks the control knob against a detent as an indication that the control knob has been rotated to its stop position.

Reversing the movement of the control knob 70 abruptly brings the end 92 of the lever 86 against the recess 94 of the slide mount 62 to begin lowering the head which causes the tape bias arm 100 to be moved again by the protrusion 97 engaging the arcuate cam surface and to contact the tape 30, urging the tape away from the magnetic head as the head is lowered to a position beneath the cartridge 10. As the head continues to be lowered, as shown in FIG. 4, the tape bias arm is then again moved away from the tape and the lever 86 continues to move the slide mount 62 against the bias of its spring 110 and the bias of spring 90 to the lowered position. As the cam shaft 72 is rotated further, the pin 98 will engage the shorter leg of the tape bias arm 100, if spring 102 has not rotated the longer leg clockwise, to positively rotate the arm 100 to the position of FIG. 3. This avoids the lever 76 from closing the access door 44 before the tape bias arm is in the normal position of FIG. 3. Continued movement of the control knob 70 past its initial position to an eject position causes the cartridge to be lifted off the shoulder adjacent the opening 48 and the leaf spring 68 will then drive the cartridge forward through the opening 48.

Suitable interface circuitry is provided to connect the tape drive motor 75, the head position motor 114 and the magnetic head 46 to the associated computer system.

Having thus described the present invention it will be understood that modifications may be made in the structure without departing from the spirit or the scope of the invention as defined in the appended claims.

I claim:

1. A drive mechanism for a rectangular tape cartridge having an access door along one side edge and adjacent one end thereof for exposing tape extending longitudinal in a plane along a path across a cutaway portion of said cartridge, said mechanism comprising:
   a frame having an opening for receiving said one end of a said tape adjacent said access door,
   a magnetic head mounted for sliding movement generally in the plane of and normal to the longitudinal extension of said tape, the sliding movement of said head being from a retracted position with respect to the tape to a raised position adjacent said tape,
   a tape bias arm mounted for pivotal movement on said frame adjacent said magnetic head, and
   means mounted on said head for engaging and pivoting said arm to a position engaging said tape to move said tape away from said head upon movement of said head from said retracted position to said raised position adjacent said path of said tape, and then to release the tape into engagement with said head when said head is in said raised position adjacent said tape.

2. A drive mechanism according to claim 1 comprising means for opening said access door to expose the tape and said cutaway portion.

3. A drive mechanism according to claim 1 comprising a single cam shaft supported on said frame and extending in the direction of insertion of a said cartridge, said cam shaft including means operative, upon rotation thereof, for opening said access door and for causing said sliding movement of said head.

4. A drive mechanism according to claim 1 wherein said tape bias arm comprises a generally L-shaped member having a long leg and a short leg meeting at a vertex pivoted on said frame at its vertex and said means mounted on said head is protrusion engaging said long leg upon said sliding movement of said head to force said long leg into engagement with said tape to move said tape away from said head.

* * * * *